United States Patent
Biswas et al.

(10) Patent No.: US 11,496,372 B2
(45) Date of Patent: Nov. 8, 2022

(54) PROVIDING FAST TRIGGER MATCHING TO SUPPORT BUSINESS RULES THAT MODIFY CUSTOMER-SUPPORT TICKETS

(71) Applicant: Zendesk, Inc., San Francisco, CA (US)

(72) Inventors: Sanjeev Kumar Biswas, Singapore (SG); Vancheswaran Koduvayur Ananthanarayanan, San Francisco, CA (US)

(73) Assignee: Zendesk, Inc., San Francisco, CA (US)

( * ) Notice: Subject to any disclaimer, the term of this patent is extended or adjusted under 35 U.S.C. 154(b) by 0 days.

(21) Appl. No.: 16/932,199

(22) Filed: Jul. 17, 2020

(65) Prior Publication Data
US 2022/0021591 A1 Jan. 20, 2022

(51) Int. Cl.
| | |
|---|---|
| *H04L 12/24* | (2006.01) |
| *H04L 41/5074* | (2022.01) |
| *H04L 41/12* | (2022.01) |
| *H04L 41/0893* | (2022.01) |
| *H04L 41/5054* | (2022.01) |

(52) U.S. Cl.
CPC ...... *H04L 41/5074* (2013.01); *H04L 41/0893* (2013.01); *H04L 41/12* (2013.01); *H04L 41/5054* (2013.01)

(58) Field of Classification Search
CPC . H04L 41/5074; H04L 41/0893; H04L 41/12; H04L 41/5054
See application file for complete search history.

(56) References Cited

U.S. PATENT DOCUMENTS

| | | | | |
|---|---|---|---|---|
| 7,237,138 | B2 * | 6/2007 | Greenwald | G06F 11/2257 714/4.3 |
| 8,041,799 | B1 * | 10/2011 | Usery | H04Q 3/0075 714/48 |
| 10,547,498 | B1 * | 1/2020 | Garner, IV | H04L 41/065 |
| 2018/0300041 | A1 * | 10/2018 | Tilikin | G06F 16/219 |
| 2020/0192874 | A1 * | 6/2020 | Mann | G06Q 10/0633 |

\* cited by examiner

*Primary Examiner* — Esther B. Henderson
*Assistant Examiner* — Nazia Naoreen
(74) *Attorney, Agent, or Firm* — Park, Vaughan, Fleming & Dowler LLP

(57) ABSTRACT

The disclosed embodiments provide a system that automatically updates a customer-support ticket in an online customer-support system. When the customer-support ticket is created or updated, the system applies a set of triggers, which modify the ticket based on business rules, wherein each trigger performs actions that modify the ticket when conditions for parameters associated with the ticket are satisfied. When applying a trigger to the ticket, the system evaluates the conditions for the trigger by evaluating an associated condition graph, which is a directed graph comprised of condition nodes, wherein each condition node specifies conditions on parameters associated with the ticket. During this evaluation, if a valid path through the condition graph is discovered, which comprises a sequence of satisfied condition nodes from the root node to a null node, the system fires the trigger, which involves performing actions associated with the trigger to update the ticket.

25 Claims, 11 Drawing Sheets

```
ACME support@acme.com - ACME Support

If Ticket is New
   AND Current Via is Email
   AND Brand is "X178908"
   AND (recipient is support@acme.com
      OR recipient is support@acme.zendesk.com)

Then Tags include "acme_at"
   AND Ticket Form is "OneForm"
   AND Ticket Field is "Department" is "Finance"
   AND Ticket Field "Issue Type" is "Urgent"
```

FIG. 4

PROVIDING FAST TRIGGER MATCHING TO SUPPORT BUSINESS RULES THAT MODIFY CUSTOMER-SUPPORT TICKETS

BACKGROUND

Field

The disclosed embodiments generally relate to the design of customer-support resources for e-commerce systems. More specifically, the disclosed embodiments relate to a customer-support system that provides fast trigger matching to support business rules that automatically modify customer-support tickets.

Related Art

As electronic commerce continues to proliferate, customers are beginning to use online customer-service resources to solve problems, and to obtain information related to various products or services. These online customer-service resources commonly include customer-support ticketing systems, which are designed to help customers, by: providing helpful information to the customers; directing customers to specific workflows; or facilitating interactions with customer-support agents. When designed properly, these online customer-support resources can automate many customer-support interactions, thereby significantly reducing a company's customer-support costs.

While processing tickets, it can be advantageous to apply predefined business rules, which are based on triggers, to automatically modify the tickets. For example, if a ticket relates to a problem in shipping a time-critical item, the business rule can cause the priority of the ticket to be increased. In another example, if the ticket originates from an email address that is associated with malicious emails, a business rule can cause the ticket to be automatically suspended. Note that automatically applying these business rules to tickets eliminates the need to manually modify tickets. This increases the speed at which tickets are processed, and reduces the amount of work that customer-support agents need to perform while processing tickets.

However, applying these types of business rules efficiently requires the associated triggers to be evaluated quickly. Also, large customer accounts tend to use many business rules, and this means they make use of a large number of triggers to control their ticket life cycle. However, the more triggers an account has, the more complex the associated evaluations become, which can significantly slow down execution. (In fact, the computational complexity of the trigger evaluation time grows as $n^2$, where n is the number of triggers.) The associated delays in processing triggers can cause large customers to become dissatisfied, which makes it hard to keep those customers happy.

Hence, what is needed is a customer-support system that facilitates fast trigger matching to support business rules that automatically modify customer-support tickets.

SUMMARY

The disclosed embodiments relate to a system that automatically updates a customer-support ticket in an online customer-support system. During operation, when the customer-support ticket is created or updated, the system applies a set of triggers, which modify the ticket based on business rules, to the ticket, wherein each trigger in the set of triggers performs one or more actions that modify the ticket when one or more conditions for parameters associated with the ticket are satisfied. During this process, when applying a trigger to the ticket, the system evaluates the one or more conditions for the trigger by evaluating an associated condition graph, which is a directed graph comprised of condition nodes, wherein each condition node specifies conditions on one or more parameters associated with the ticket. During this evaluation, if a valid path through the condition graph is discovered, wherein the valid path comprises a sequence of satisfied condition nodes from the root node to a null node, the system fires the trigger, which involves performing the one or more actions associated with the trigger to update the ticket.

In some embodiments, each condition node exists in one of the following states: an undecided state in which the condition node has not been evaluated; a satisfied state in which the condition node has been evaluated and found to be satisfied; and an unsatisfied state in which the condition node has been evaluated and found to be unsatisfied.

In some embodiments, triggers in the set of triggers are applied to the ticket in a precedence ordering.

In some embodiments, after a ticket is updated as a result of firing a trigger, the system identifies one or more parameters in the ticket that were modified by the trigger. Next, the system unmarks condition nodes in condition graphs of all triggers that depend on the modified parameters, wherein the unmarking process sets a condition node to be in the undecided state. The system subsequently continues to apply the set of triggers to the ticket restarting at the beginning of the precedence ordering while removing the fired trigger from future consideration.

In some embodiments, the system completes the process of applying the set of triggers to the ticket when all unfired triggers in the set of triggers have been evaluated without causing a trigger to fire.

In some embodiments, while unmarking the condition nodes, the system first identifies condition nodes to be unmarked by searching for condition nodes that: depend on the modified parameters; are associated with unfired triggers; and have already been evaluated and are either in the satisfied or unsatisfied states.

In some embodiments, the system marks a condition graph as unsatisfiable if all possible paths through the condition graph are blocked by a condition node in the unsatisfied state, wherein unsatisfiable condition graphs are not evaluated while applying the set of triggers to the ticket. The system also marks an unsatisfiable condition graph to be possibly satisfiable whenever an unsatisfied condition node in the unsatisfiable condition graph becomes unmarked.

In some embodiments, prior to applying the set of triggers to the ticket, the system performs a preprocessing operation. During this preprocessing operation, the system initializes condition graphs for each trigger in the set of triggers. Next, the system initializes a trigger-graph map that points to a condition graph for each trigger in the set of triggers to facilitate rapidly accessing condition graphs for triggers. The system also initializes a parameter-to-node map that points to all condition nodes that depend on each parameter to facilitate rapidly updating condition nodes that depend on modified parameters.

In some embodiments, a condition graph can specify AND conditions and OR conditions.

In some embodiments, a trigger can be associated with one or more of the following actions: changing a priority of a ticket; changing an assignee for the ticket; assigning a group of customer-support agents to the ticket; changing a state in a life cycle of the ticket; and changing a ticket type for the ticket.

In some embodiments, a trigger can be associated with conditions that are based on the following: a status of the ticket; a language of the ticket; a requester who caused the ticket to be created; a brand associated with the ticket; and how the ticket arrived at the customer-support system.

BRIEF DESCRIPTION OF THE FIGURES

FIG. 4 presents a textual representation of a trigger in accordance with the disclosed embodiments.

DETAILED DESCRIPTION

The following description is presented to enable any person skilled in the art to make and use the present embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present embodiments. Thus, the present embodiments are not limited to the embodiments shown, but are to be accorded the widest scope consistent with the principles and features disclosed herein.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing computer-readable media now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium. Furthermore, the methods and processes described below can be included in hardware modules. For example, the hardware modules can include, but are not limited to, application-specific integrated circuit (ASIC) chips, field-programmable gate arrays (FPGAs), and other programmable-logic devices now known or later developed. When the hardware modules are activated, the hardware modules perform the methods and processes included within the hardware modules.

Discussion

Figure 3:
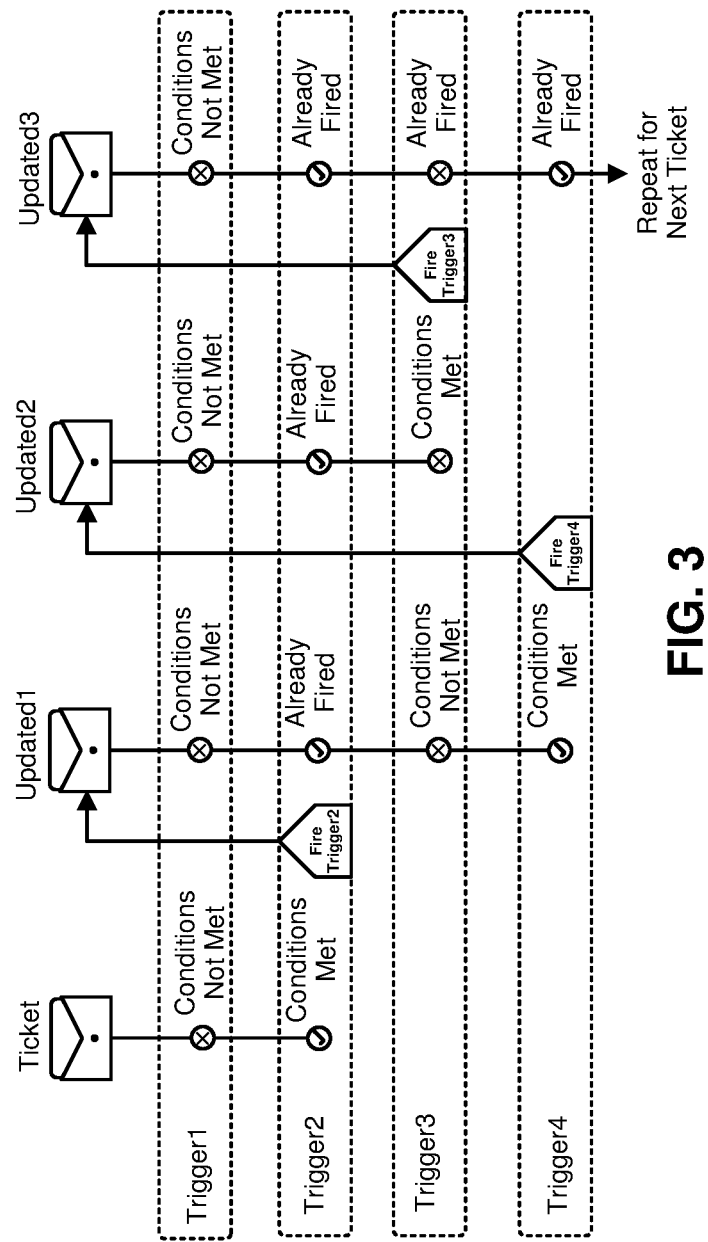
FIG. 3 illustrates a trigger-processing example in accordance with the disclosed embodiments.

The diagram in FIG. 3 illustrates how a list of triggers is processed. wherein this process is initiated whenever a ticket changes. Starting at the left side of FIG. 3, when a ticket changes, the system first evaluates trigger1 and as a result of this evaluation determines that the associated conditions are not met. Next, the system evaluates trigger2 and determines that the associated conditions are met. This causes trigger2 to fire, which causes the ticket to be updated. Next, the system evaluates trigger1 again and determines that the conditions are not met. It then skips trigger2 because trigger2 has already fired, and evaluates trigger3 and determines that the conditions are not met. Next, the system evaluates trigger4 and determines that the conditions are met, which causes trigger4 to fire and update the ticket. The system then evaluates trigger1 again and determines that the conditions are not met. It skips trigger2 because trigger2 has already fired. The system then evaluates trigger3 and determines that the conditions are met. This causes trigger3 to fire, which updates the ticket. Finally, the system evaluates trigger1 again and determines that the conditions are not met. Also, all of the other triggers have fired, so the processing of the ticket is complete. The system then repeats the process when another ticket changes.

To facilitate this type of ticket processing, our system represents the conditions defined in each trigger as a "condition graph" comprised of condition nodes, wherein each condition node represents an expression, such as "Department is equal to Accounts." Each condition node exists in one of the following states: an undecided state in which the condition node has not been evaluated; a satisfied state in which the condition node has been evaluated and found to be satisfied; and an unsatisfied state in which the condition node has been evaluated and found to be unsatisfied.

Within a condition graph, an edge between two nodes represents the AND operand, and if a node has two or more edges it has OR conditions. We store a mapping between each trigger identifier and its associated condition graph. We also store a mapping between each parameter/attribute of a ticket and a corresponding list pointer, which points to a linked list of pointers, wherein each pointer in the linked list points to a condition node in a condition graph, wherein the condition node depends on the parameter/attribute. These two mappings can be used to quickly determine which trigger gets fired, or whether no trigger gets fired.

While evaluating a condition graph, we start at the root node of the condition graph and perform a depth-first search and evaluate each condition node we encounter to determine whether the condition node is "satisfied" or "unsatisfied." (Note that unevaluated condition nodes are always in the "undecided" state.) While evaluating a condition graph, when we discover a path from the root of the condition graph that passes through satisfied nodes to reach a terminal node of the condition graph (also referred to as a "null node"), the condition graph is satisfied. In this case, we execute the associated action for the trigger. When the action is executed, it changes some of the parameters/attributes of the ticket, which can possibly cause the state of some condition nodes to change, which can affect associated trigger firings. Hence, we repeat the evaluation process starting with the first trigger but exclude any triggers that have been fired.

Implementation Details

In our system, a trigger is represented as a set of one or more conditions and a set of one or more actions. If the set of conditions is satisfied, the system performs the set of actions. These actions can update the ticket state, which in turn may cause another trigger to fire. This process continues until no triggers are fired in a given round. (Note that a trigger that was fired in a preceding round is not processed in the current round.)

Figure 5:
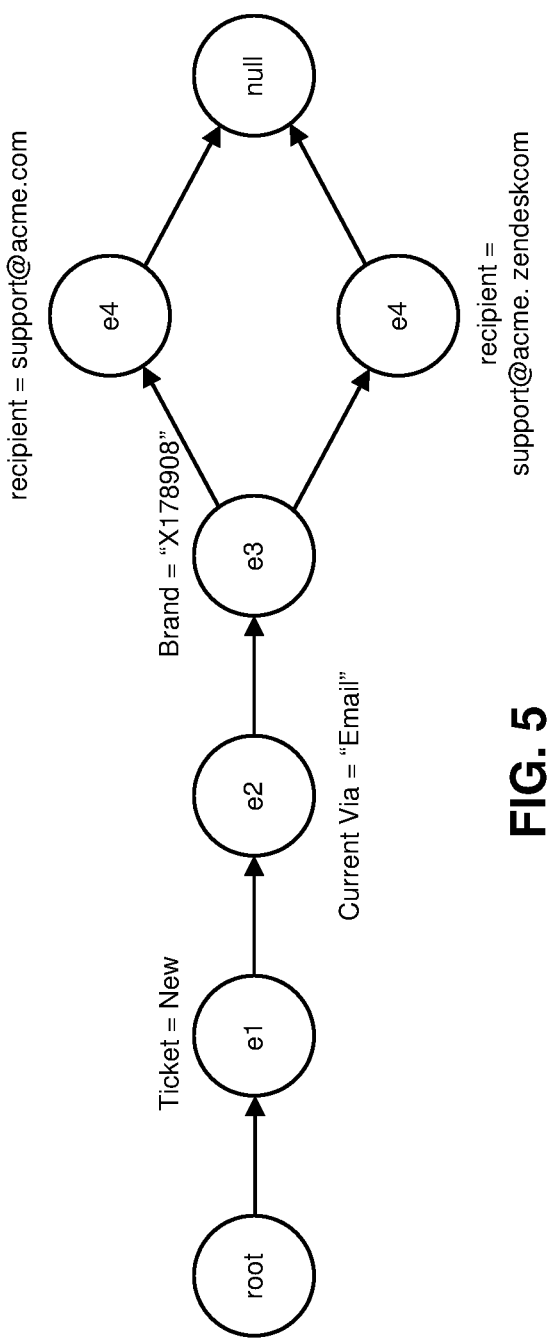
FIG. 5 illustrates a corresponding condition graph for the trigger that appears in FIG. 4 in accordance with the disclosed embodiments.

A typical trigger is illustrated in the example that appears in FIG. 4 and a corresponding condition graph is illustrated in FIG. 5. The trigger illustrated in FIG. 4 will fire if either of the following conditions is true.

Condition1: e1 AND e2 AND e3 AND e4
Condition2: e1 AND e2 AND e3 AND e5

The actions that are performed when the trigger fires can be represented as a set of instructions, which for example can comprise a series of setter operations on the ticket parameters.

During operation, the system first performs a preprocessing step, which involves constructing two data structures, a TriggerGraphMap and a ParameterToNodeMap. The TriggerGraphMap provides a mapping between the trigger identifier and a pointer to the root node of its corresponding condition graph. The ParameterToNodeMap provides a mapping between each unique parameter to a list of pointers to condition nodes, which depend on the parameter. Both of these data structures are constructed after the triggers are initially created, and they are updated when triggers are created, modified or deleted.

Figure 6:
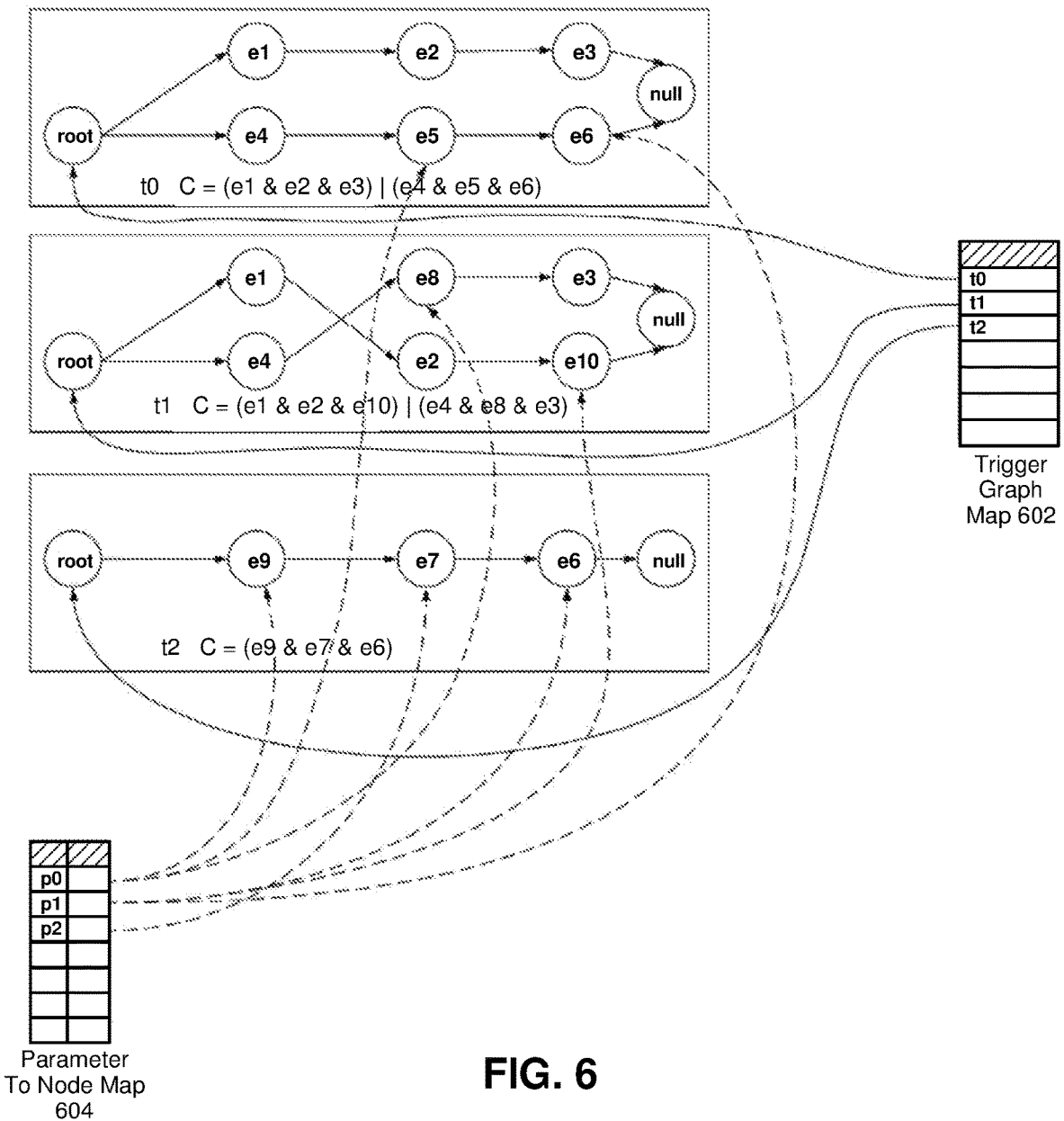
FIG. 6 illustrates data structures generated during a pre-processing operation in accordance with the disclosed embodiments.

Referring to the example illustrated in FIG. 6, within parameter to node map 604, pointers associated with parameter p0 point to the e5 node of trigger t0, the e8 node of trigger t1 and e9 node of trigger t2. In contrast, pointers associated with the parameter p1 point to the e6 node of trigger t0, the e10 node of trigger t1 and the e6 node of trigger t2. Finally, the pointer associated with parameter p2 only points to the e7 node of trigger t2. As can be seen in this example, a given parameter may be present in different condition nodes in different condition graphs.

Next, during a "path-finding step," the system searches for the first condition graph (in a precedence ordering of the condition graphs) that contains a "valid path" from the root node to the null node that passes through satisfied condition nodes. For every undecided condition node the system encounters during this process, the system evaluates the condition node, and marks it as either satisfied or unsatisfied. If no valid paths are found, the system proceeds to evaluate the condition graph for the next trigger, which can be accessed through the trigger graph map 602.

Figure 7:
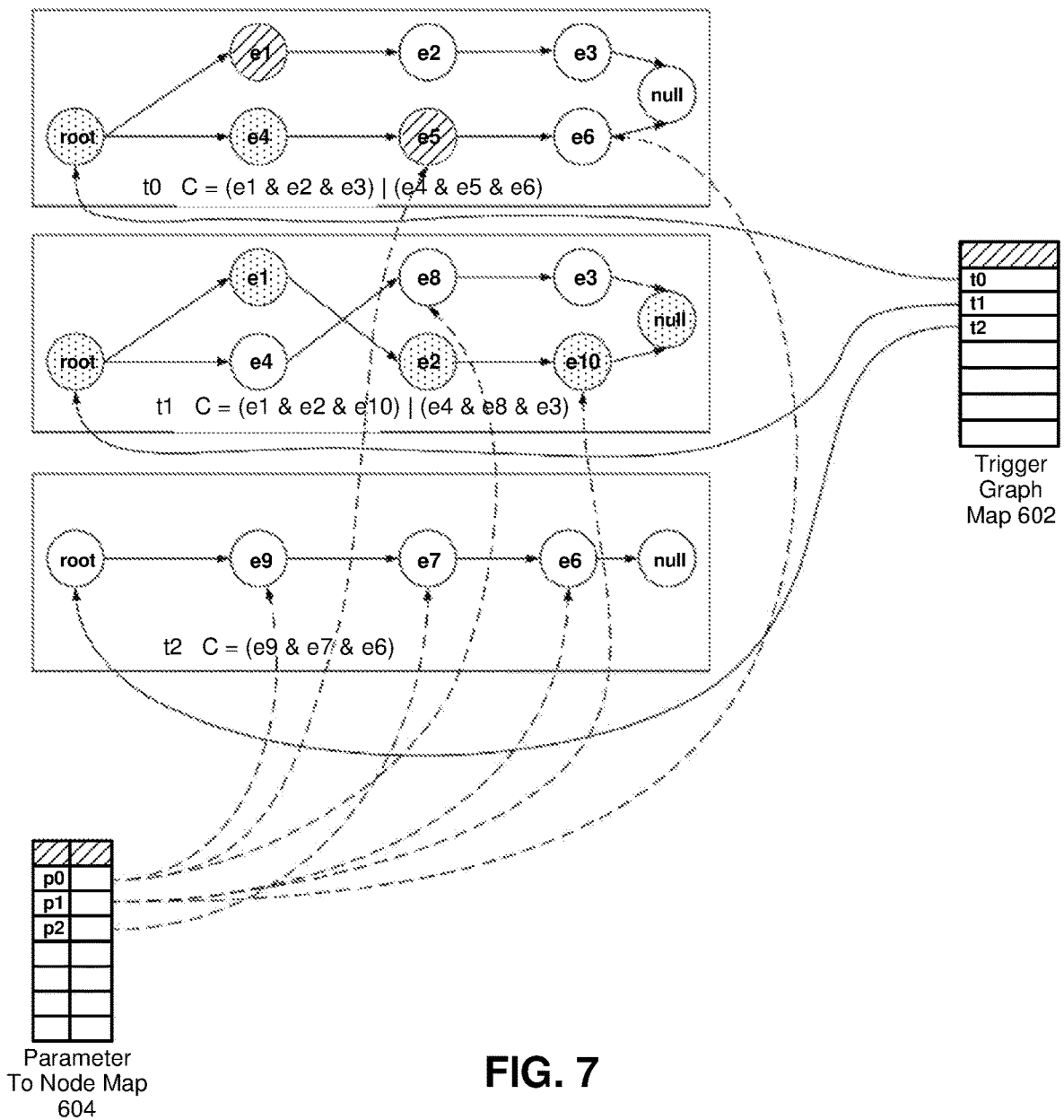
FIG. 7 illustrates how a path is found through satisfied nodes in accordance with the disclosed embodiments.

If the condition graphs for all of the triggers are evaluated, and no valid paths are found, the system terminates the process and the path-finding step is complete. On the other hand, if the system discovers a valid path in a condition graph, the associated trigger fires. For example, in the diagram that appears in FIG. 7, undecided nodes are white (they have no fill pattern), satisfiable nodes have a spotted pattern and unsatisfiable nodes have a hatched pattern. In this example, we could not find a valid path through the condition graph for trigger t0, but we found one through the condition graph for trigger t1. So, trigger t1 is fired.

When the selected trigger fires, we perform an "action step," which updates the ticket with new values for parameters based on actions associated with the selected trigger. Note that we do not update a parameter if its current value is the same as the new value set by the action. We then construct a list of updated parameters and proceed to the next step.

Next, for every updated parameter in the list of updated parameters, we use the ParameterToNodeMap to locate all condition nodes that depend on an updated parameter, and change their state to undecided if they are either in the satisfied or unsatisfied states and they belong to a graph which is still in consideration. (Note that after a trigger fires, the trigger is removed from further consideration.)

Figure 8:
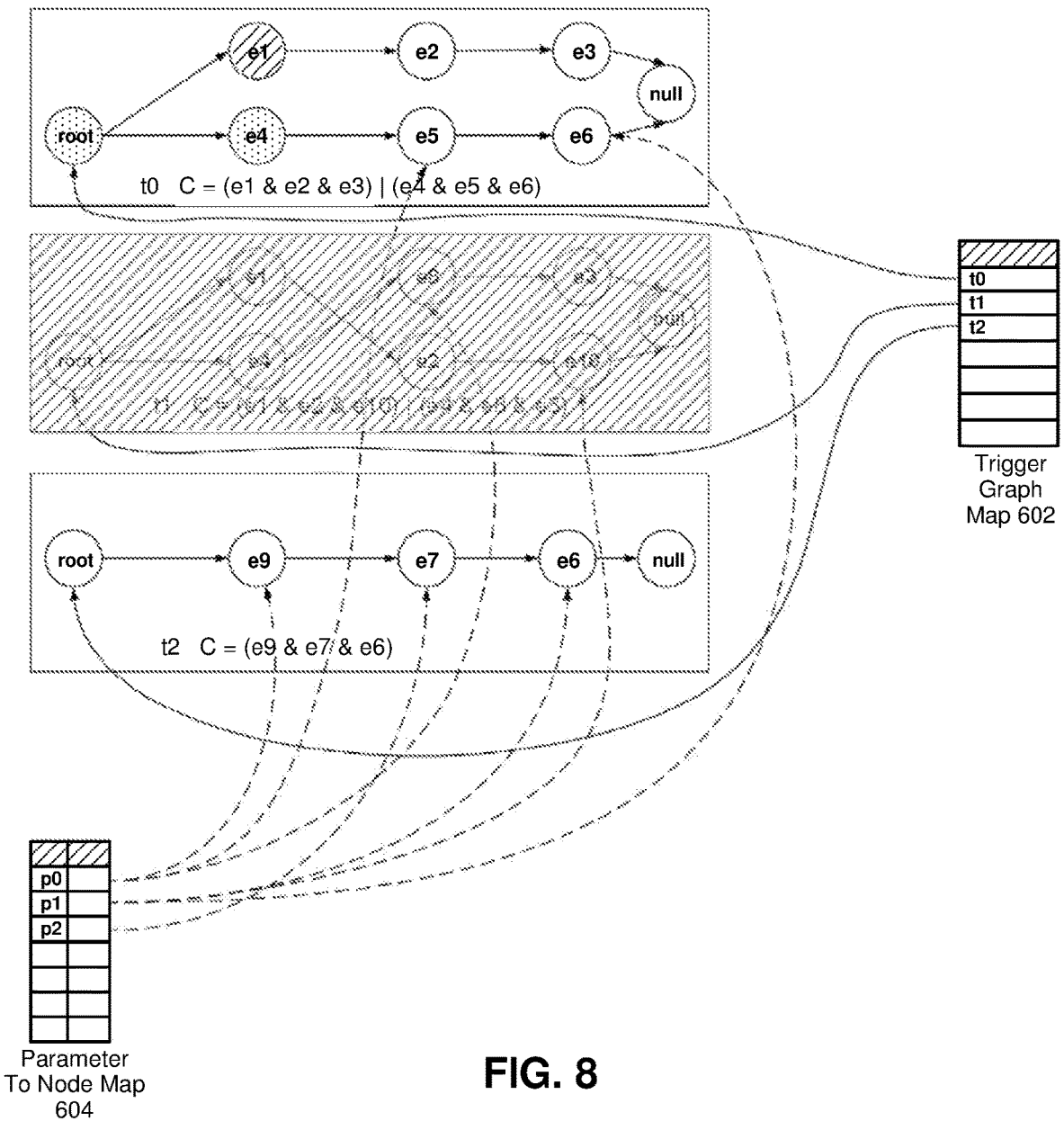
FIG. 8 illustrates how nodes are updated after a trigger firing in accordance with the disclosed embodiments.

This is illustrated in the diagram that appears in FIG. 8. In this example that appears in FIG. 8, trigger t1 is selected for firing and it modifies parameter p0. Hence, we use the ParameterToNodeMap to update the states for all condition nodes that depend on the parameter p0. Note that condition node e9 is undecided, so it does not change. Moreover, condition node e8 is part of the condition graph for trigger t1, which is no longer under consideration (as is indicated by the grey hatching) because trigger t1 has already fired, hence condition node e8 does not change. However, condition node e5 in the condition graph trigger for t0 changes from the satisfied state to the undecided state during this updating process. Next, the system returns to the path-finding step and repeats the entire process for all triggers that have not fired.

The above-described trigger-evaluation process can be optimized by marking graphs as unsatisfiable. This can be accomplished as follows. In the path-finding step, if we search and find a condition graph "g" that does not have a valid path, we keep track of this fact using an "unsatisfiable graph map." In all subsequent attempts to find a valid path through the same condition graph g, we first check the unsatisfiable graph map, and if g is marked as unsatisfiable, we do not perform a valid path search for condition graph g because the condition graph g was previously determined to be unsatisfiable. In the action step, for any condition graph g that is indicated to be unsatisfiable in the unsatisfiable graph map, if we change a condition node n in the condition graph g, from the unsatisfied state to the undecided state, we remove the graph g from the unsatisfied graph map.

Before discussing the above-described ticket-modification system further, we first describe an exemplary computing environment in which it can operate.

Computing Environment

Figure 1:
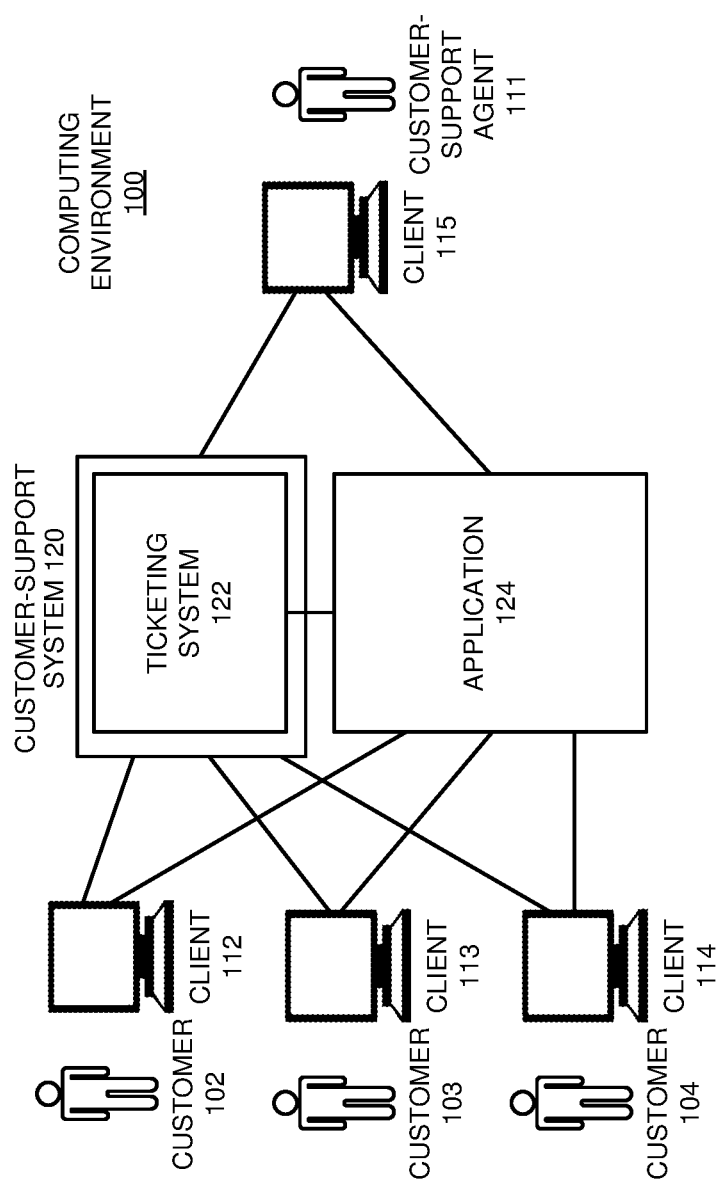
FIG. 1 illustrates a computing environment including an application and an associated customer-support system in accordance with the disclosed embodiments.

FIG. 1 illustrates an exemplary computing environment 100 in which a trigger-based ticket-modification system operates. At the highest level, computing environment 100 includes an application 124 and ticketing system 122. Within computing environment 100, a number of customers 102-104 interact with application 124 through client computer systems 112-114, respectively. Application 124 is provided by an organization, such as a commercial enterprise, to enable customers 102-104 to perform various operations associated with the organization, or to access one or more services provided by the organization. For example, application 124 can include online accounting software that customers 102-104 can access to prepare and file tax returns online. In another example, application 124 provides a commercial website for selling sporting equipment. Note that application 124 can be hosted on a local or remote server.

If customers 102-104 have problems or questions about application 124, they can access a customer-support system 120 to obtain help dealing with issues, which can include various problems and questions. For example, a user of accounting software may need help using a feature of the accounting software, or a customer of a website that sells sporting equipment may need help cancelling an order that was erroneously entered. This help may be provided by a customer-service agent 111 who operates a client computing system 115 and interacts with customers 102-104 through customer-support system 120. This help may also involve automatically suggested helpful articles that the customer can read to hopefully resolve the problem or question. Note that customer-service agent 111 can access application 124 (either directly or indirectly through customer-support system 120) to help resolve an issue.

In some embodiments, customer-support system 120 is not associated with computer-based application 124, but is instead associated with another type of product or service that is offered to a customer. For example, customer-support system 120 can provide assistance with a product, such as a television, or with a service, such as a package-delivery service.

Customer-support system 120 organizes customer issues using a ticketing system 122, which generates tickets to represent each customer issue. Ticketing systems are typically associated with a physical or virtual "help center" (or "help desk") for resolving customer problems. Ticketing system 122 comprises a set of software resources that enable a customer to resolve an issue. Specific customer issues are associated with abstractions called "tickets," which encapsulate various data and metadata associated with the customer requests to resolve an issue. (Within this specification, tickets are more generally referred to as "customer requests.") An exemplary ticket can include a ticket identifier, and information (or links to information) associated with the problem. For example, this information can include: (1) information about the problem; (2) customer information for one or more customers who are affected by the problem; (3) agent information for one or more customer-service agents who are interacting with the customer; (4) email and other electronic communications about the problem (which, for example, can include a question posed by a customer about the problem); (5) information about telephone calls associated with the problem; (6) timeline information associated with customer-service interactions to resolve the problem, including response times and resolution times, such as a first reply time, a time to full resolution and a requester wait time; and (7) effort metrics, such as a number of communications or responses by a customer, a number of times a ticket has been reopened, and a number of times the ticket has been reassigned to a different customer-service agent.

The operation of customer-support system 120 is described in further detail below.

Customer-Support System

Figure 2:
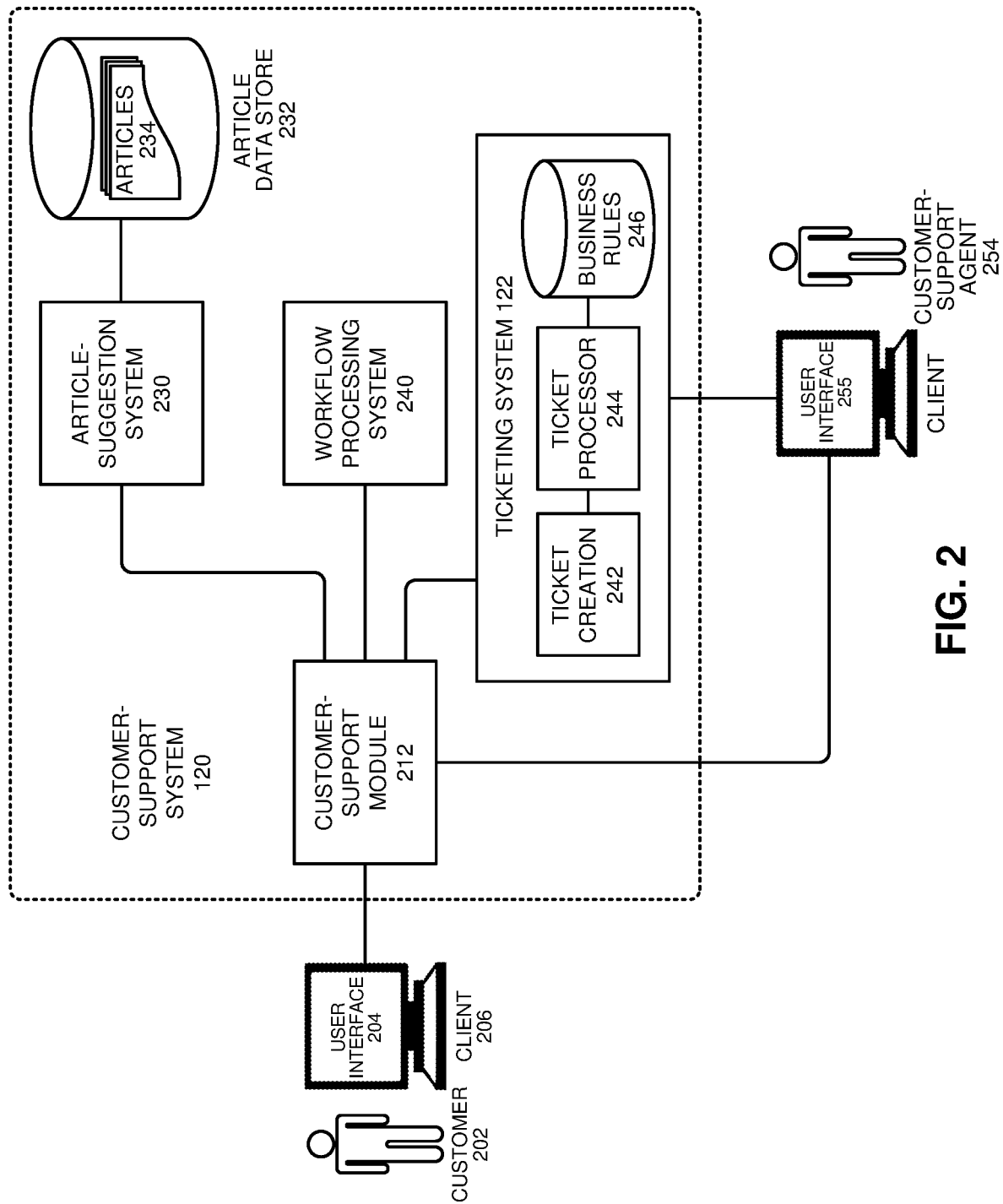
FIG. 2 illustrates components that comprise the customer-support system in accordance with the disclosed embodiments.

FIG. 2 illustrates how a customer 202 interacts with customer-support system 120 in accordance with the disclosed embodiments. A customer 202, who has an issue with a product or a service associated with application 124, interacts with customer-support system 120 through a user interface 204 in a client system 206. During this process, customer 202 submits a request to customer-support system 120 to obtain help with the issue, thereby initiating an automated customer-support interaction. (Note that user interface 204 can be implemented in a number of different ways for both mobile and desktop platforms. For example, user interface 204 can be incorporated into: a web page, an email, or a UI screen provided by an application.)

The request from customer 202 is directed to a customer-support module 212 within customer-support system 120. Customer-support module 212 can perform various responsive customer-support actions. For example, customer-support module 212 can cause customer 202 to receive one or more helpful articles from an article-suggestion system 230 to facilitate resolving the customer's issue. During this process, article-suggestion system 230 obtains the one or more helpful articles from a set of help center articles 234 contained in an article data store 232.

Customer-support module 212 can also trigger a predefined workflow from workflow processing system 240 to help resolve the customer's issue. For example, the predefined workflow can be associated with one or more of the following: obtaining status information for an order; changing a delivery address for an order; issuing a refund for an order; issuing an exchange for an order; resetting the customer's password; updating details of the customer's account; and canceling the customer's account.

As another alternative, customer-support module 212 can put the customer 202 in touch with a human customer-support agent 254 to help resolve the customer's issue. The customer's issue will hopefully be resolved through one or more of these customer-support actions.

Customer-support module 212 makes use of ticketing system 122 (described above) to keep track of customer requests. To facilitate processing customer requests, tickets from ticketing system 122 are typically presented to customer-support agent 254 through a user interface 255. Ticketing system 122 includes a ticket creation module 242, which creates tickets in response to communications from customers. It also includes a ticket processor 244, which performs various operations to facilitate processing tickets. When a ticket is created or updated, ticket processor 244 automatically applies various triggers associated with business rules 246 to the ticket to automatically update parameters in the ticket as is described in more detail below.

Trigger-Related Processing Operations

Figure 9:
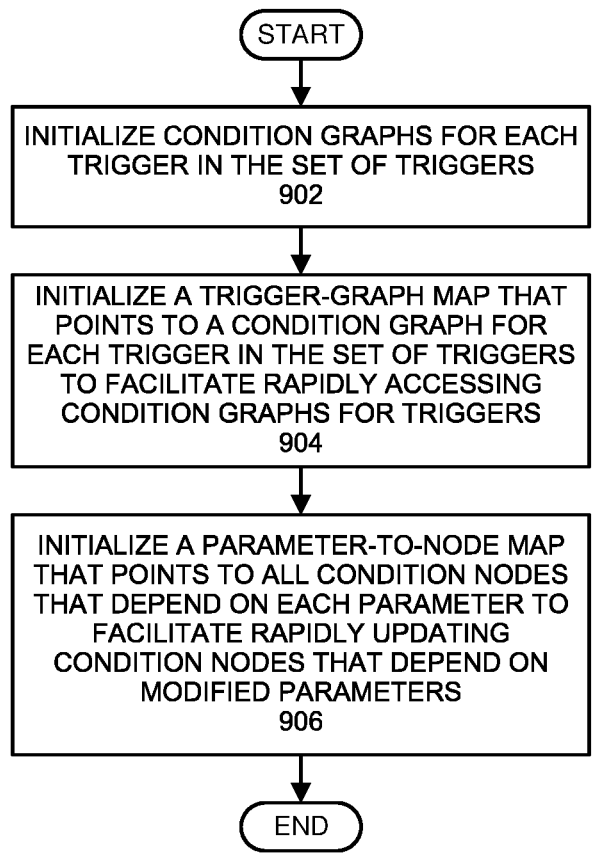
FIG. 9 presents a flow chart illustrating operations performed during preprocessing operations in accordance with the disclosed embodiments.

FIG. 9 presents a flow chart illustrating operations performed during a preprocessing operation in accordance with the disclosed embodiments. During this preprocessing operation, the system initializes condition graphs for each trigger in the set of triggers (step 902). Next, the system initializes a trigger-graph map that points to a condition graph for each trigger in the set of triggers to facilitate rapidly accessing condition graphs for triggers (step 904). The system also initializes a parameter-to-node map that points to all condition nodes that depend on each parameter to facilitate rapidly updating condition nodes that depend on modified parameters (step 906).

Figure 10A:
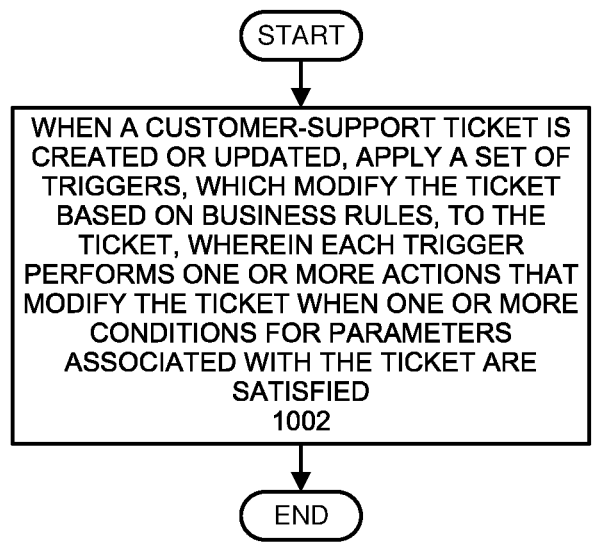
FIG. 10A presents a flow chart illustrating operations performed that cause a set of triggers to be applied to a ticket in accordance with the disclosed embodiments.
Figure 10B:
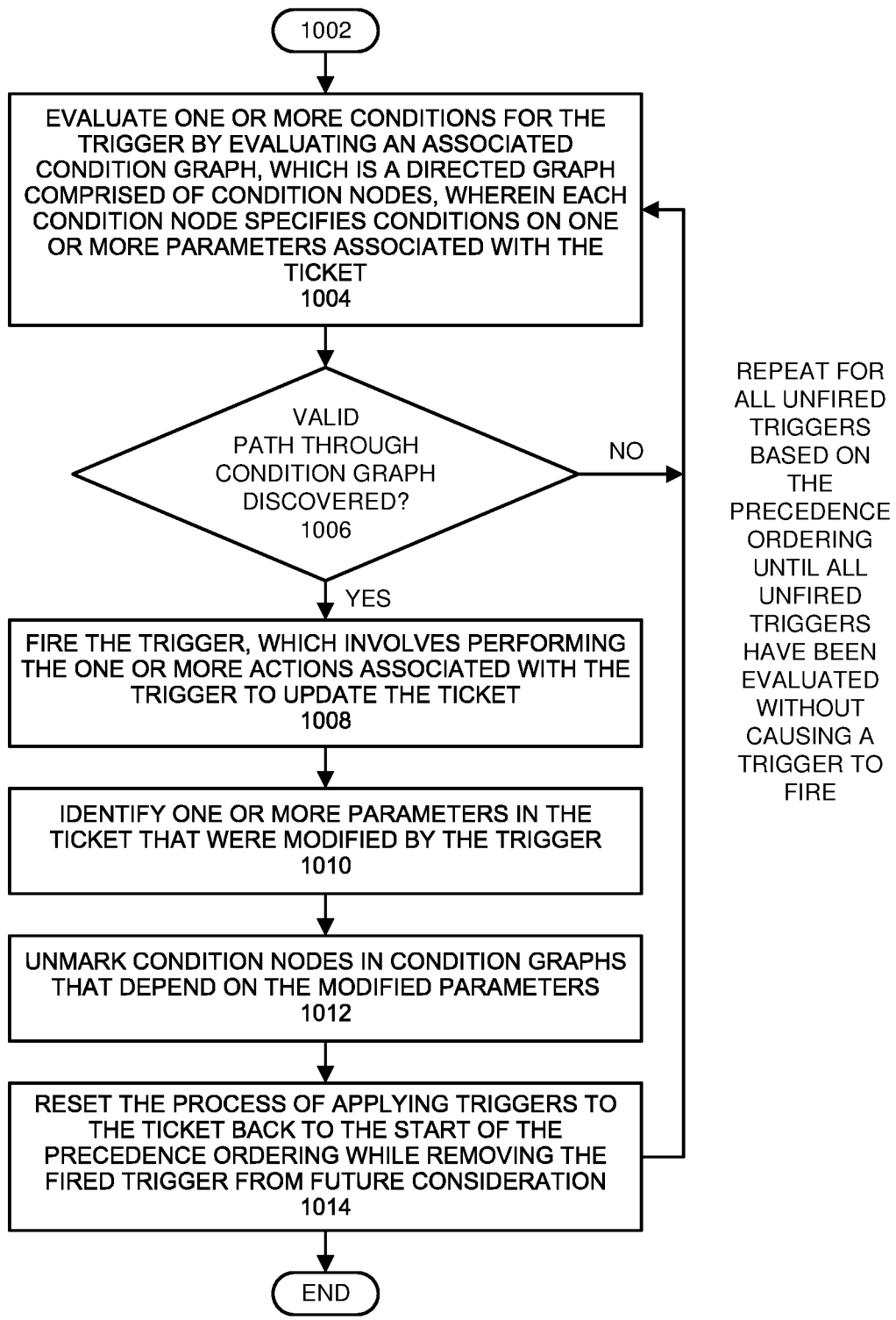
FIG. 10B presents a flow chart illustrating operations performed while applying the set of triggers to a ticket in accordance with the disclosed embodiments.

FIGS. 10A and 10B present flow charts illustrating operations performed while applying a set of triggers to a ticket in accordance with the disclosed embodiments. First, referring to FIG. 10A, when a customer-support ticket is created or updated, the system applies a set of triggers, which modify the ticket based on business rules, to the ticket, wherein each trigger in the set of triggers performs one or more actions that modify the ticket when one or more conditions for parameters associated with the ticket are satisfied (step 1002). While applying the set of triggers to the ticket in step 1002, the system processes individual triggers in the set of triggers based on a precedence ordering as is illustrated in FIG. 10B. Starting with a first trigger in the precedence ordering, the system first evaluates one or more conditions for the trigger by evaluating an associated condition graph, which is a directed graph comprised of condition nodes, wherein each condition node specifies conditions on one or more parameters associated with the ticket (step 1004). Next, the system determines whether a valid path through the condition graph is discovered, wherein the valid path comprises a sequence of satisfied condition nodes from the root node to a null node (step 1006). If not (NO at step 1006), the system returns to step 1004 to process the next trigger in the precedence ordering. On the other hand, if a valid path is discovered (YES at step 1006), the system fires the trigger, which involves performing the one or more actions associated with the trigger to update the ticket (step 1008). Next, the system identifies one or more parameters in the ticket that were modified by the trigger (step 1010). The system then unmarks condition nodes in condition graphs that depend on the modified parameters, wherein the unmarking process sets a condition node to be in the undecided state (step 1012). Note that this can involve using the parameter-to-node map described above to rapidly identify nodes in condition graphs that depend on the modified parameters. Next, the system resets the process of applying triggers to the ticket back to the start of the precedence ordering while removing the fired trigger from future consideration (step 1014). The system then returns to step 1004 to apply the set of triggers again.

Figure 11:
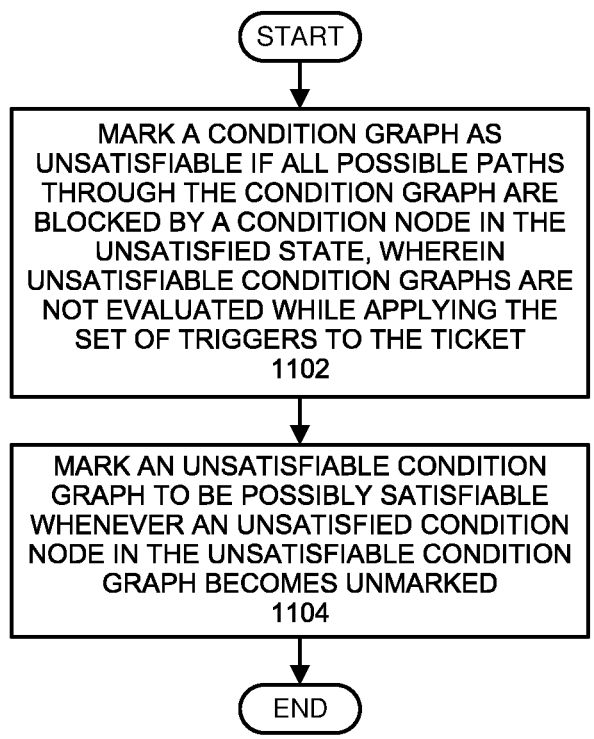
FIG. 11 presents a flow chart illustrating operations performed to facilitate marking a condition graph as unsatisfiable in accordance with the disclosed embodiments.

FIG. 11 presents a flow chart illustrating operations performed to facilitate marking a condition graph as unsatisfiable in accordance with the disclosed embodiments. First, the system marks a condition graph as unsatisfiable if all possible paths through the condition graph are blocked by a condition node in the unsatisfied state, wherein unsatisfiable condition graphs are not evaluated while applying the set of triggers to the ticket (step 1102). The system also marks an unsatisfiable condition graph to be possibly satisfiable whenever an unsatisfied condition node in the unsatisfiable condition graph becomes unmarked (step 1104). Note that by not having to evaluate unsatisfiable condition graphs, the system can save a considerable amount of computation time while applying the set of triggers to the ticket. Moreover, the process of keeping track of which condition graphs are unsatisfiable is relatively simple.

Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the principles and features disclosed herein.

The foregoing descriptions of embodiments have been presented for purposes of illustration and description only. They are not intended to be exhaustive or to limit the present description to the forms disclosed. Accordingly, many modifications and variations will be apparent to practitioners skilled in the art. Additionally, the above disclosure is not intended to limit the present description. The scope of the present description is defined by the appended claims.

What is claimed is:

1. A method for automatically updating a customer-support ticket in an online customer-support system, comprising:
defining multiple triggers for customer-support tickets, wherein each trigger specifies one or more associated actions to perform when the trigger is fired;
for each trigger, constructing an associated condition graph comprising condition nodes, wherein each condition node specifies conditions regarding one or more parameters associated with the ticket; and
when the customer-support ticket is created or updated, applying a first set of triggers by, for each trigger in the set of triggers:
evaluating the associated condition graph to determine whether a valid path exists through the condition graph, from a root node to a null node, wherein a valid path comprises a sequence of condition nodes whose specified conditions are satisfied; and
if a valid path exists, firing the trigger and performing the one or more associated actions.

2. The method of claim 1, wherein each condition node exists in one of the following states:
an undecided state in which the condition node has not been evaluated;
a satisfied state in which the condition node has been evaluated and found to be satisfied; and
an unsatisfied state in which the condition node has been evaluated and found to be unsatisfied.

3. The method of claim 2, wherein triggers in the set of triggers are applied to the ticket in a precedence ordering.

4. The method of claim 3, wherein after a ticket is updated as a result of firing a trigger, the method further comprises:
identifying one or more parameters in the ticket that were modified by the trigger;
unmarking condition nodes in condition graphs of all triggers that depend on the modified parameters, wherein the unmarking process sets a condition node to be in the undecided state; and
continuing to apply the set of triggers to the ticket restarting at the beginning of the precedence ordering while removing the fired trigger from future consideration.

5. The method of claim 4, wherein the method further comprises completing the process of applying the set of triggers to the ticket when all unfired triggers in the set of triggers have been evaluated without causing a trigger to fire.

6. The method of claim 4, wherein while unmarking the condition nodes, the method involves first identifying condition nodes to be unmarked by searching for condition nodes that:
depend on the modified parameters;
are associated with unfired triggers; and
have already been evaluated and are either in the satisfied or unsatisfied states.

7. The method of claim 4, wherein the method further comprises:
marking a condition graph as unsatisfiable if all possible paths through the condition graph are blocked by a condition node in the unsatisfied state, wherein unsatisfiable condition graphs are not evaluated while applying the set of triggers to the ticket; and marking an unsatisfiable condition graph to be possibly satisfiable whenever an unsatisfied condition node in the unsatisfiable condition graph becomes unmarked.

8. The method of claim 4, wherein prior to applying the set of triggers to the ticket, the method further comprises performing a preprocessing operation, which involves:

initializing condition graphs for each trigger in the set of triggers;

initializing a trigger-graph map that points to a condition graph for each trigger in the set of triggers to facilitate rapidly accessing condition graphs for triggers; and initializing a parameter-to-node map that points to all condition nodes that depend on each parameter to facilitate rapidly updating condition nodes that depend on modified parameters.

9. The method of claim 1, wherein a condition graph can specify AND conditions and OR conditions.

10. The method of claim 1, wherein a trigger can be associated with one or more of the following actions:

changing a priority of a ticket;
changing an assignee for the ticket;
assigning a group of customer-support agents to the ticket;
changing a state in a life cycle of the ticket; and
changing a ticket type for the ticket.

11. The method of claim 1, wherein one or more condition nodes are associated with conditions that are based on the following:

a status of the ticket;
a language of the ticket;
a requester who caused the ticket to be created;
a brand associated with the ticket; and
how the ticket arrived at the customer-support system.

12. A non-transitory computer-readable storage medium storing instructions that when executed by a computer cause the computer to perform a method for automatically updating a customer-support ticket in an online customer-support system, the method comprising:

defining multiple triggers for customer-support tickets, wherein each trigger specifies one or more associated actions to perform when the trigger is fired;

for each trigger, constructing an associated condition graph comprising condition nodes, wherein each condition node specifies conditions regarding one or more parameters associated with the ticket; and when the customer-support ticket is created or updated, applying a first set of triggers by, for each trigger in the set of triggers:

evaluating the associated condition graph to determine whether a valid path exists through the condition graph, from a root node to a null node, wherein a valid path comprises a sequence of condition nodes whose specified conditions are satisfied; and if a valid path exists, firing the trigger and performing the one or more associated actions.

13. The non-transitory computer-readable storage medium of claim 12, wherein each condition node exists in one of the following states:

an undecided state in which the condition node has not been evaluated;
a satisfied state in which the condition node has been evaluated and found to be satisfied; and
an unsatisfied state in which the condition node has been evaluated and found to be unsatisfied.

14. The non-transitory computer-readable storage medium of claim 13, wherein triggers in the set of triggers are applied to the ticket in a precedence ordering.

15. The non-transitory computer-readable storage medium of claim 14, wherein after a ticket is updated as a result of firing a trigger, the method further comprises:

identifying one or more parameters in the ticket that were modified by the trigger;

unmarking condition nodes in condition graphs of all triggers that depend on the modified parameters, wherein the unmarking process sets a condition node to be in the undecided state; and continuing to apply the set of triggers to the ticket restarting at the beginning of the precedence ordering while removing the fired trigger from future consideration.

16. The non-transitory computer-readable storage medium of claim 15, wherein the method further comprises completing the process of applying the set of triggers to the ticket when all unfired triggers in the set of triggers have been evaluated without causing a trigger to fire.

17. The non-transitory computer-readable storage medium of claim 15, wherein while unmarking the condition nodes, the method involves first identifying condition nodes to be unmarked by searching for condition nodes that:

depend on the modified parameters;
are associated with unfired triggers; and
have already been evaluated and are either in the satisfied or unsatisfied states.

18. The non-transitory computer-readable storage medium of claim 15, wherein the method further comprises:

marking a condition graph as unsatisfiable if all possible paths through the condition graph are blocked by a condition node in the unsatisfied state, wherein unsatisfiable condition graphs are not evaluated while applying the set of triggers to the ticket; and marking an unsatisfiable condition graph to be possibly satisfiable whenever an unsatisfied condition node in the unsatisfiable condition graph becomes unmarked.

19. The non-transitory computer-readable storage medium of claim 15, wherein prior to applying the set of triggers to the ticket, the method further comprises performing a preprocessing operation, which involves:

initializing condition graphs for each trigger in the set of triggers;

initializing a trigger-graph map that points to a condition graph for each trigger in the set of triggers to facilitate rapidly accessing condition graphs for triggers; and initializing a parameter-to-node map that points to all condition nodes that depend on each parameter to facilitate rapidly updating condition nodes that depend on modified parameters.

20. The non-transitory computer-readable storage medium of claim 12, wherein a condition graph can specify AND conditions and OR conditions.

21. A system that automatically updates a customer-support ticket in an online customer-support system, comprising:

at least one processor and at least one associated memory; and an updating mechanism, which executes on the at least one processor, wherein during operation, the updating mechanism does the following:

defines multiple triggers for customer-support tickets, wherein each trigger specifies one or more associated actions to perform when the trigger is fired;

for each trigger, constructs an associated condition graph comprising condition nodes, wherein each condition node specifies conditions regarding one or more parameters associated with the ticket; and when the customer-support ticket is created or updated, applies a first set of triggers by, for each trigger in the set of triggers:
- evaluating the associated condition graph to determine whether a valid path exists through the condition graph, from a root node to a null node, wherein a valid path comprises a sequence of condition nodes whose specified conditions are satisfied; and
- if a valid path exists, firing the trigger and performing the one or more associated actions.

22. The system of claim 21, wherein each condition node exists in one of the following states:
- an undecided state in which the condition node has not been evaluated;
- a satisfied state in which the condition node has been evaluated and found to be satisfied; and
- an unsatisfied state in which the condition node has been evaluated and found to be unsatisfied.

23. The system of claim 22, wherein triggers in the set of triggers are applied to the ticket in a precedence ordering.

24. The system of claim 23, wherein after a ticket is updated as a result of firing a trigger, the updating mechanism:
- identifies one or more parameters in the ticket that were modified by the trigger;
- unmarks condition nodes in condition graphs of all triggers that depend on the modified parameters, wherein the unmarking process sets a condition node to be in the undecided state; and
- continues to apply the set of triggers to the ticket restarting at the beginning of the precedence ordering while removing the fired trigger from future consideration.

25. The system of claim 24, wherein the updating mechanism completes the process of applying the set of triggers to the ticket when all unfired triggers in the set of triggers have been evaluated without causing a trigger to fire.

* * * * *